(12) United States Patent
Porat et al.

(10) Patent No.: US 7,924,713 B2
(45) Date of Patent: Apr. 12, 2011

(54) ADMISSION CONTROL FOR TELECOMMUNICATIONS NETWORKS

(75) Inventors: Haim Porat, Tel-Aviv (IL); Oren Ben-Kiki, Tel-Aviv (IL)

(73) Assignee: Tejas Israel Ltd, Herzelia Pitvach (IL)

( * ) Notice: Subject to any disclaimer, the term of this patent is extended or adjusted under 35 U.S.C. 154(b) by 708 days.

(21) Appl. No.: 11/346,147

(22) Filed: Feb. 1, 2006

(65) Prior Publication Data

US 2006/0245356 A1 Nov. 2, 2006

(30) Foreign Application Priority Data

Feb. 1, 2005 (IL) .......................................... 166615

(51) Int. Cl.
*H04L 12/26* (2006.01)
(52) U.S. Cl. ...................................................... 370/230
(58) Field of Classification Search .................. 370/232, 370/235, 444, 399, 252, 465, 254; 398/58
See application file for complete search history.

(56) References Cited

U.S. PATENT DOCUMENTS

| | | | | |
|---|---|---|---|---|
| 6,665,273 | B1 * | 12/2003 | Goguen et al. ............... | 370/252 |
| 6,760,325 | B1 * | 7/2004 | Hameleers et al. ........... | 370/352 |
| 6,771,598 | B1 | 8/2004 | Andrews | |
| 6,791,941 | B1 | 9/2004 | Dziong et al. | |
| 6,882,623 | B1 * | 4/2005 | Goren et al. ................. | 370/230 |
| 6,967,923 | B1 * | 11/2005 | Fang ............................. | 370/232 |
| 6,999,420 | B1 * | 2/2006 | Chiu et al. .................... | 370/231 |
| 7,061,861 | B1 * | 6/2006 | Mekkittikul et al. ......... | 370/230 |
| 7,072,295 | B1 * | 7/2006 | Benson et al. ................ | 370/230 |
| 7,245,635 | B2 * | 7/2007 | Mo et al. ....................... | 370/468 |
| 7,684,322 | B2 * | 3/2010 | Sand et al. .................... | 370/230 |
| 2003/0028670 | A1 * | 2/2003 | Lee et al. ...................... | 709/241 |
| 2003/0072264 | A1 * | 4/2003 | Mo et al. ....................... | 370/235 |
| 2003/0091049 | A1 * | 5/2003 | Abe et al. ...................... | 370/392 |
| 2003/0200317 | A1 | 10/2003 | Zeitak et al. | |
| 2004/0081092 | A1 | 4/2004 | Rhee et al. | |
| 2004/0128384 | A1 | 7/2004 | Rolia et al. | |
| 2004/0136379 | A1 * | 7/2004 | Liao et al. ................. | 370/395.21 |
| 2004/0184406 | A1 * | 9/2004 | Iwamura ....................... | 370/235 |
| 2004/0233845 | A1 * | 11/2004 | Jeong et al. ................... | 370/230 |

(Continued)

FOREIGN PATENT DOCUMENTS

JP 2000332787 11/2000

(Continued)

OTHER PUBLICATIONS

Fineberg at el. An End-to-End QoS Architecture with the MPLS-Based Core, 0-7803-7658-7/02/$17.00 (C) 2002 IEEE.*

(Continued)

*Primary Examiner* — Chirag G Shah
*Assistant Examiner* — Otis L Thompson, Jr.
(74) *Attorney, Agent, or Firm* — Deborah Gador

(57) ABSTRACT

A method and system for controlling admission of data traffic to a telecommunications network having an allocatable bandwidth, at least one physical link and at least two pre-defined flows over the link, the method including receiving input data of each of the at least one physical links in the network, the data including for each of the links a wire rate bandwidth, a provisioned committed bandwidth, and a provisioned best effort bandwidth; calculating a bandwidth available for best effort from the wire rate bandwidth and the provisioned committed bandwidth; and allocating the bandwidth available for best effort between the flows substantially proportionally to the provisioned best effort bandwidth.

40 Claims, 3 Drawing Sheets

U.S. PATENT DOCUMENTS

2007/0189180 A1* 8/2007 Schelen et al. ............... 370/252

FOREIGN PATENT DOCUMENTS

| | | |
|---|---|---|
| JP | 2001144803 | 5/2001 |
| JP | 2002237842 | 8/2002 |
| JP | 2003087314 | 3/2003 |
| JP | 2003143189 | 5/2003 |
| JP | 2003198611 | 7/2003 |
| JP | 2004266389 | 9/2004 |

OTHER PUBLICATIONS

Cisco System inc., Quality of Service in MPLS Networks, May 18, 2001.*

Y. Thomas Hou et al., A Core-Stateless Buffer Management Mechanism for Differentiated Services Internet, 0-7695-0912-6/0$01 0.00 © 2000 IEEE.*

* cited by examiner

ADMISSION CONTROL FOR TELECOMMUNICATIONS NETWORKS

The present application claims the benefit of Israel Patent Application Ser. No. 166615, filed on Feb. 1, 2005, expressly incorporated herein by reference in its entirety.

FIELD OF THE INVENTION

The present invention relates to a method and system for admission control for telecommunications networks in general and, in particular, to a method and system for admission control for data communication over Ethernet networks.

BACKGROUND INFORMATION

Packet switched networks are generally based on shared bandwidth topology. In this topology, each node has unlimited and uncontrolled access to network resources. A commonly used network access system, known as statistical multiplexing, transmits data simultaneously from any number of input devices attached to the network, and offers maximum utilization of the network's available bandwidth by assigning to each device unrestricted access to the network. However, with this kind of multiplexing, several inherent problems arise:

- Network behavior is erratic and unpredictable due, in part, to collisions between data packets that different nodes are attempting to transmit at the same time.
- Network resources are unfairly distributed, with ingress nodes which are closer to certain egress nodes getting much more bandwidth than ingress nodes which are remote from those egress nodes.
- Traffic parameters, such as delay (the time lag between the departure of a signal from the source and the arrival of the signal at the destination) and jitter (the variance from the average delay), cannot be assured.
- It is impossible to guarantee quality of service, in terms of assured bandwidth, bound delay and jitter, and packet loss, to differentiated customers or services, as defined in Service Level Agreements (SLAs).

Conventional solutions and practices for data networks involve adding complex management protocols, which generally are based on packet-by-packet traffic handling and heavy error correction and data integrity algorithms. These solutions, however, are based on local (per hop) calculations and information, and are prone to errors due to global dynamic changes, e.g., a sudden rise in network resource use in one node that causes the network to be congested for the time (typically, a few seconds) it takes for the resource management protocols to stabilize the network. With conventional dynamic networks, only over-engineering of the network can assure that the peak network use is adequately met without disturbing guaranteed traffic. This results in under-utilization of network resources at other times.

One example of admission control of traffic based on per hop statistics is shown in US patent application 2004/0128384 to Rolia, et al. This application relates to admission control of applications in resource utility environments. The method of admission control includes determining the application's statistical demand profile for resources required by the application seeking admission; determining an assurance level of the resource utility; and admitting the application based on the statistical demand profile of the application, the assurance level of the resource utility, and statistical demand profiles of one or more applications currently hosted by the resource utility. This method has the following limitations:

1. The Rolia method utilizes no prior knowledge or rules of the applications resource usage, but only a computed statistical demand profile.
2. This method can only respond to learned resource demand and decide whether it can support it or not, without the ability to rate limit the demand, e.g., bandwidth demand, continuously and dynamically according to a predefined SLA.
3. The Rolia method cannot control resource consumption once an application is allowed to run. Rather, its only choice is whether or not to permit the application to run.

Another example of a prior art solution is disclosed in U.S. Pat. No. 6,771,598 to Andrews. This patent describes a method for determining the admissibility of an offered session of traffic of a specified class to a server in a packetized communication network. The method involves defining an operating point for the server which represents the number of sessions of each respective class currently offered or currently being served, and determining whether this defined operating point falls within an admissible region. The admissible region consists of operating points for which the probability of violating a delay bound for any packet is below a threshold value. This method performs admission control based on calculation of each server's abilities based on some a priori knowledge of its behavior, and not based on actual traffic behavior throughout the network.

A further example is shown in U.S. Pat. No. 6,791,941 to Dziong, et al. This patent relates to tuning for connection admission control (CAC) algorithms in broadband ATM networks, which is accomplished using an overbooking technique based on aggregate effective bandwidth as an approximation to required bandwidth for given levels and classes of network traffic. Overbooking is introduced in small increments until a threshold value (such as a cell loss threshold value) is reached, at which point overbooking is reduced in a large step. Thus, this patent is based on a trial-and-error method for determining optimized rate control of each local traffic stream.

None of these prior art methods provides admission for data packets which is close to optimal. Accordingly, there is a long felt need for an access control mechanism which permits access to network resources based on global information, and it would be very desirable to have such a mechanism which provides more balanced utilization of network resources.

SUMMARY OF THE INVENTION

The present invention relates to a method for controlling admission of data traffic to a telecommunications network having at least two flows sharing the same physical link. In an exemplary embodiment of the present invention, there is generally never a collision between frames or packets transmitted through the defined network. This is due to, for example, the novel access and rate control algorithms, which provide access to traffic to the network only when sufficient resources have been allocated over the entire route of the traffic. In particular, the system collects and utilizes global traffic statistics from the entire network in order to determine an optimum bandwidth allocation scheme.

There is provided according to the present invention, a method for controlling admission of data traffic to a telecommunications network having an allocatable bandwidth, at least one physical link and at least two pre-defined flows over the link, the method including receiving input data of each of the physical links in the network, the data including for each of the links a wire rate bandwidth, a provisioned committed bandwidth, and a provisioned best effort bandwidth, calculating a bandwidth available for best effort from the wire rate bandwidth and the provisioned committed bandwidth, and allocating the bandwidth available for best effort between the flows substantially proportionally to the provisioned best effort bandwidth.

According to one exemplary embodiment of the present invention, the method further includes collecting bandwidth demand and actual allocation data for each of the flows in the network, calculating a demanded committed bandwidth for each physical link and a demanded best effort bandwidth for each flow, calculating a bandwidth available for best effort from the allocatable bandwidth and the demanded committed bandwidth, and allocating the bandwidth available for best effort substantially proportionally between the demanded best effort bandwidths of the flows.

Further according to an exemplary embodiment of the present invention, the method further includes calculating, from the collected data, bandwidth demand and allocation statistics of committed and best effort bandwidth for each flow in the network, and periodically performing the step of allocating based on the statistics.

According to one exemplary embodiment of the present invention, the step of collecting includes causing the switching devices to collect data traffic information regarding each of the flows and share the collected information with all the switching devices, and the step of calculating includes causing all the switching devices to calculate, from the collected data traffic information, an identical preferred bandwidth allocation for the new data traffic over the plurality of flows.

According to an alternative embodiment of the present invention, the step of collecting includes causing at least one of the switching devices to collect data traffic information regarding each of the flows and transmit the collected information to at least one calculating device, and the step of calculating includes causing the at least one calculating device to calculate, from the collected data traffic information, a preferred bandwidth allocation for the new data traffic over the plurality of flows, and to transmit the preferred bandwidth allocation as configuration instructions to all the switching devices in the network. According to one embodiment of the present invention, the calculating device is one of the switching devices. According to an alternative embodiment, the calculating device is a separate computer with software.

While the present invention is described herein with regard to a network as a whole, it will be appreciated that it can be implemented in any selected sub-network, metro network, or other routing domain, as desired. For purposes of the present application, a network is any network where bandwidth services are transmitted from point to point over a bandwidth infrastructure. In the exemplary embodiments, a domain is typically defined in which all admission decisions (i.e., access control and rate control) are controlled according to the present invention.

BRIEF DESCRIPTION OF THE DRAWINGS

The present invention will be further understood and appreciated from the following detailed description taken in conjunction with the drawings in which.

DETAILED DESCRIPTION OF EXEMPLARY EMBODIMENTS

The present invention relates to an admission control method for achieving Quality of Service (QOS) guarantees set out in Service Level Agreements (SLAs) for customers in a telecommunications network. This is accomplished, for example, by dynamically adjusting rate controls and access to the network based on actual global traffic statistics and identified traffic bandwidth demands of each flow. This method also maximizes network utilization by using these dynamic rate controls. Thus, an exemplary method is proposed including an algorithm that uses global network statistics in order to dynamically control the ingress traffic rate in such a way that the network is controlled, and bandwidth, bound jitter and delay are assured according to the SLAs between service providers and their customers.

The proposed method is based on prior knowledge of traffic SLAs regarding bandwidth consumption. Using this method, the system can limit the bandwidth to various levels according to the SLAs and thus achieve fair bandwidth allocations to all traffic flows. The proposed method can dynamically and adaptively cause a change in the demand statistics of the flow to enforce fair bandwidth resource allocation.

Figure 1:
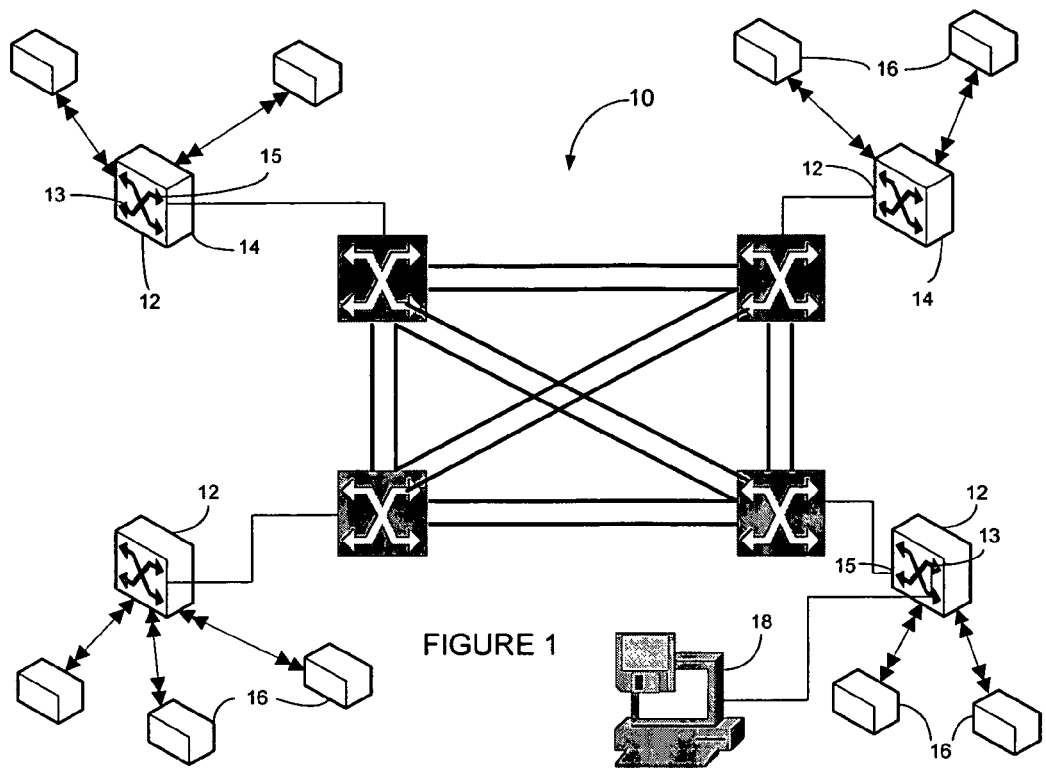
FIG. 1 is a schematic illustration of a telecommunications network constructed and operative in accordance with one exemplary embodiment of the present invention.

A proposed architecture for a telecommunications network constructed and operative in accordance with one embodiment of the present invention is illustrated schematically in FIG. 1. The exemplary algorithm of the present invention assumes a core network 10 of an arbitrary topology that is surrounded by and coupled to a plurality of edge switching devices 12, each coupled to at least one customer 16. It will be appreciated that, in a minimal network, the edge devices may be connected to one another and, generally, form the network, so there is no need for a separate core network.

Edge devices 12 are configurable switching devices of any desired construction, each having at least one ingress port 13 and one egress port 15. At least one, and possibly all, of the edge devices 12 includes a processor 14, and software (e.g., computer instructions stored on a non-transitory computer-readable storage medium) described in detail below (hereafter: proprietary edge devices). Each proprietary edge device running the algorithm is able to receive and interpret statistics packets so as to maintain its knowledge of the current global network state. This may require, for example, performing basic decompression and updating the statistics for all flows that enter the network through itself and through other switches. In order to achieve maximum network resource utilization, generally no packets should be allowed into the network without passing through a proprietary edge device. However, it is possible to utilize these edge devices in a mixed environment with other, non-proprietary edge devices, with degraded results. In the latter case, each non-proprietary edge device is assumed to utilize the maximum allowed bandwidth it can use, so congestion and traffic loss will be avoided.

In the processors 14 of the proprietary edge devices are stored data identifying all the other edge devices in the network and all of the routes through the network. It will be appreciated that the minimum number of proprietary edge devices required to collect traffic data, and to determine the admission control scheme, is the number that permits all the bandwidth demand and allocation statistics of all the flows in the network to be collected or calculated by extrapolation. Provisioning tables, indicating the bandwidth guarantees to each flow, are also stored in each proprietary edge device. It will be appreciated that the core network may be virtual, e.g. implemented as a guaranteed bandwidth slice of a TDM network.

According to one exemplary embodiment of the present invention, the system further includes a central management device 16 coupled to the edge switching devices. The central management device 16 includes a processor and runs the proprietary software, so it can be used to configure the edge devices offline together with, or instead of, the edge devices. In this embodiment, the central management device may perform many or all of the calculations of traffic statistics and bandwidth allocation instead of the edge devices.

In the illustrated embodiment, the proprietary edge devices are coupled to each other and to the management device, if any, for in-band management. It will be appreciated that the amount of traffic required for the distribution of this information between the various edge devices is low (estimated to be less than 1% of the available bandwidth), especially if basic compression schemes are applied to the packets. Furthermore, there is no need to mark the statistics packets as belonging to a different priority class. Instead, an added flow is defined for these packets requiring guaranteed (low) bandwidth, and they are provisioned for like any other normal flow. Alternatively, the edge devices may be physically coupled to one another for out-of-band management.

All traffic through the core network is assumed to be associated with one of a predefined set of flows between an ingress port 13 in an edge device and an egress port 15 in an edge device. It will be appreciated that the minimum network over which the present invention is useful is two flows over a single physical link. Each flow is associated with specific source and destinations and QOS (Quality of Service) requirements. Preferably, these source and destinations and QOS requirements are fixed for a relatively long time relative to the data transfer rate through the network, and change to other fixed requirements at the time of topology change, logical link change, service requirement change, etc. The flow source and destinations and QOS requirements are assured by the algorithm of the present invention, which is executed in at least one, and preferably in each of the surrounding edge devices 12, and/or in the management device 16. The core network 10 may be implemented using standard equipment. The minimal requirement from this equipment is to implement Ethernet switching, i.e., be able to correctly direct packets according to their MAC addresses in the context of the network's topology.

Operation of the network according to the present invention is as follows. Each incoming packet is associated with a particular flow using pre-defined classification rules, according to the service level agreement of the customer for that type of traffic. These classification rules are generally static, although they are updated offline whenever a change in a type or class of service (or bit rate) occurs. Once the appropriate flow for the packet has been selected, the flow routing and bandwidth allocation are determined by the algorithm of the present invention, running in the edge devices and/or in the central management station.

At the same time, demand statistics regarding the packet are collected and statistics concerning the attempted and actually allocated bandwidth consumption for that flow are updated. In accordance with the exemplary embodiments of the present invention, the packets directed to each flow enter a queue, thereby "throttling" the flow to each given bandwidth. The bandwidth allocated to each flow may change frequently (several times per second) according to the network statistics of traffic requesting ingress throughout the network at any given time, taken together with the fixed initial bandwidth allocations and collected traffic statistics (but without overloading the network).

Once the bandwidth has been allocated to the packet, switching occurs and the packet is directed to one or more appropriate outgoing ports, for transmission through the network. It will be appreciated that, since the flows are throttled, the total packets bandwidth that is directed to any outgoing port is guaranteed not to exceed the bandwidth capacity of the port.

After entering the network, the packet is directed along its pre-defined route until it leaves the network through an appropriate proprietary edge device. Here, too, the packet is classified and associated with a particular flow. Optional allocated bandwidth data of the flow are collected and statistics concerning the actual and attempted bandwidth consumption for that flow are updated and sent to the edge devices or management station, for control purposes, such as verifying zero frame loss and delay guarantees. Now the packet is switched to one or more appropriate outgoing ports leading outside the network for transmission to one or more customers.

It will be appreciated that, since sufficient resources were allocated over the entire flow at the time the traffic entered the network, the total packets bandwidth that is directed to any network ingress port is known in advance and is guaranteed not to exceed the bandwidth capacity of that port.

The movement of packets throughout the network may be controlled by any generic routing protocol. As flows are added or removed in the network, or change their source or destinations and/or their QOS requirements, all the affected edge devices and core network nodes must be informed of the change, and the provisioning tables must be updated substantially simultaneously to reconfigure the network. It is a particular feature of the invention that the optimized provisioning scheme for a given set of flows over a given network provided by the algorithm of the invention will ensure that all committed bandwidth (here illustrated as CBR (Committed Bit Rate)) flow requirements can be met and that excess network capacity is "fairly" distributed between all best effort bandwidth (here illustrated as UBR (Unspecified Bit Rate)) flow requirements. Computing such an optimal bandwidth resource allocation can be accomplished using any of several well-known optimization techniques, such as constraint based algorithms.

Figure 2:
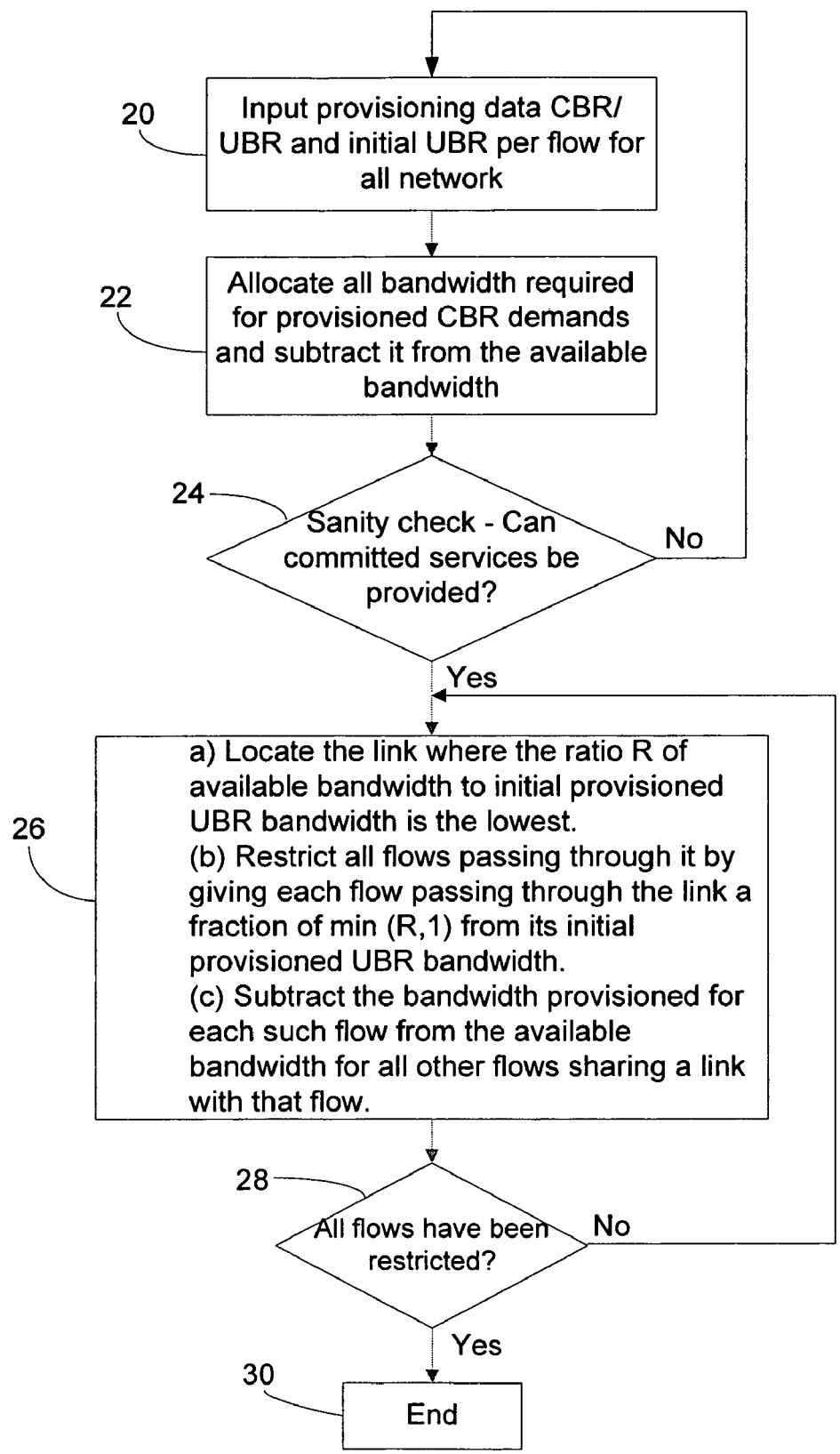
FIG. 2 is a flow chart illustrating an initial bandwidth allocation and configuration change algorithm according to one exemplary embodiment of the present invention.

One example of a fundamental bandwidth allocation algorithm for use in providing an initial provisioning scheme for the network and during reconfiguration is illustrated in FIG. 2. The network is assumed to be not configured, but it is a prerequisite that the network operator know the network parameters as detailed hereunder and the required services and/or logical links. The initial bandwidth allocation includes several processes designed to allow the network to start operating in a stable and efficient way from point zero. Thus, an initial division into flows and routes is provided for the start of operation of the network.

Details of the various classes of service provided to each customer are input into the management device's software (e.g., via a user interface including, e.g., an input device such as a keyboard, a mouse, and/or a graphical user interface), which distributes it to the necessary edge devices, or directly into one or more edge devices. Details of the various logical links and each flow's bandwidth demands, as well as an initial amount of CBR and UBR for each flow (block 20), are also input to the device or devices, which performs an initial bandwidth distribution calculation. This means that, for each physical link, the bandwidth required for current CBR demands of that link is allocated, and this amount is subtracted from the total available bandwidth, known as the wire rate, for that link (block 22). The device now performs a "sanity check", i.e., it verifies that all the services can be provided (e.g. that the sum of CBR traffic at any link is no greater than the maximum permitted bandwidth) (block 24). If the sanity check is not passed, the user is informed and corrected provisioning CBR/UBR data must be input to the device.

Once the sanity check is passed, the following three steps are carried out (block 26): (a) The physical link where the ratio R, of available bandwidth to the bandwidth provisioned for UBR (according to the SLA's), is the lowest is located; (b) All flows passing through this link are restricted in a fair manner, i.e., each flow passing through the link is allocated a function of R of its provisioned UBR bandwidth, for example consisting of min (R,1), where $$R = \frac{WR - \sum CBR_{Provisioned}}{\sum UBR_{Provisioned}}$$

(WR being the wire rate bandwidth of the link), meaning that each flow is allocated either: the fraction of its provisioned UBR bandwidth obtained by multiplying the provisioned bandwidth by R, or the total provisioned bandwidth for that flow, whichever is smaller; and (c) The bandwidth allocated for each such flow is now subtracted from the available bandwidth for all other flows passing through any of the same physical links that this flow passes through. These three steps are repeated until all links at all the edge devices have been considered and all the flows have been restricted (block 28), at which time the process ends (block 30), and the system begins to operate using this initial bandwidth allocation scheme.

The above fundamental algorithm may be enhanced in various ways to provide more fine-grained QOS control. For example:

At the time of allocating bandwidth for CBR demands, the software may differentiate between "always on" and "on demand" CBR flow requirements. "Always on" CBR requirements will be allocated to their flow regardless of the actual bandwidth demand. "On demand" CBR bandwidth requirements would only be allocated to the flow only if actually used.

Associating a "priority" with each UBR requirement. Then, in step (b) above, more bandwidth would be allocated to higher priority flows than to lower priority ones, rather than providing equal allocation to all UBR traffic.

It will be appreciated that, at any time, the user may change the network topology by adding or removing devices and physical links. The user may also provision, remove or change new or existing services over the existing topology, or change topology and update the services at once. In such a case, the same steps will be followed. First, the user inputs (via, e.g., a user interface) new parameters for the configuration change to the management device or edge devices, together with the new CBR/UBR provisioning data for the new or changed flows, the classes of service provided to the customer, and the modified physical connection scheme of the network elements, i.e., which port is connected to which other port by which physical link. The management device and/or at least one edge device will recalculate the bandwidth allocation scheme for the entire network, as described above.

The key to the success of the dynamic control algorithm of the present invention is correct allocation of bandwidth to each incoming flow. In theory, the allocation algorithm should have an exact knowledge of the amount of bandwidth that each flow attempts to inject into the network at each point in time. Thus, preferably, each edge device collects data of demanded bandwidth for each incoming flow through that edge device. Alternatively, this knowledge may be approximated by some of the edge devices collecting traffic data and extrapolating demand statistics for all the remaining devices in the network. It will be appreciated that while all the edge devices may collect these statistics, it is sufficient for the number of edge devices which permits extrapolation of traffic data throughout the entire network to collect statistics.

Figure 3:
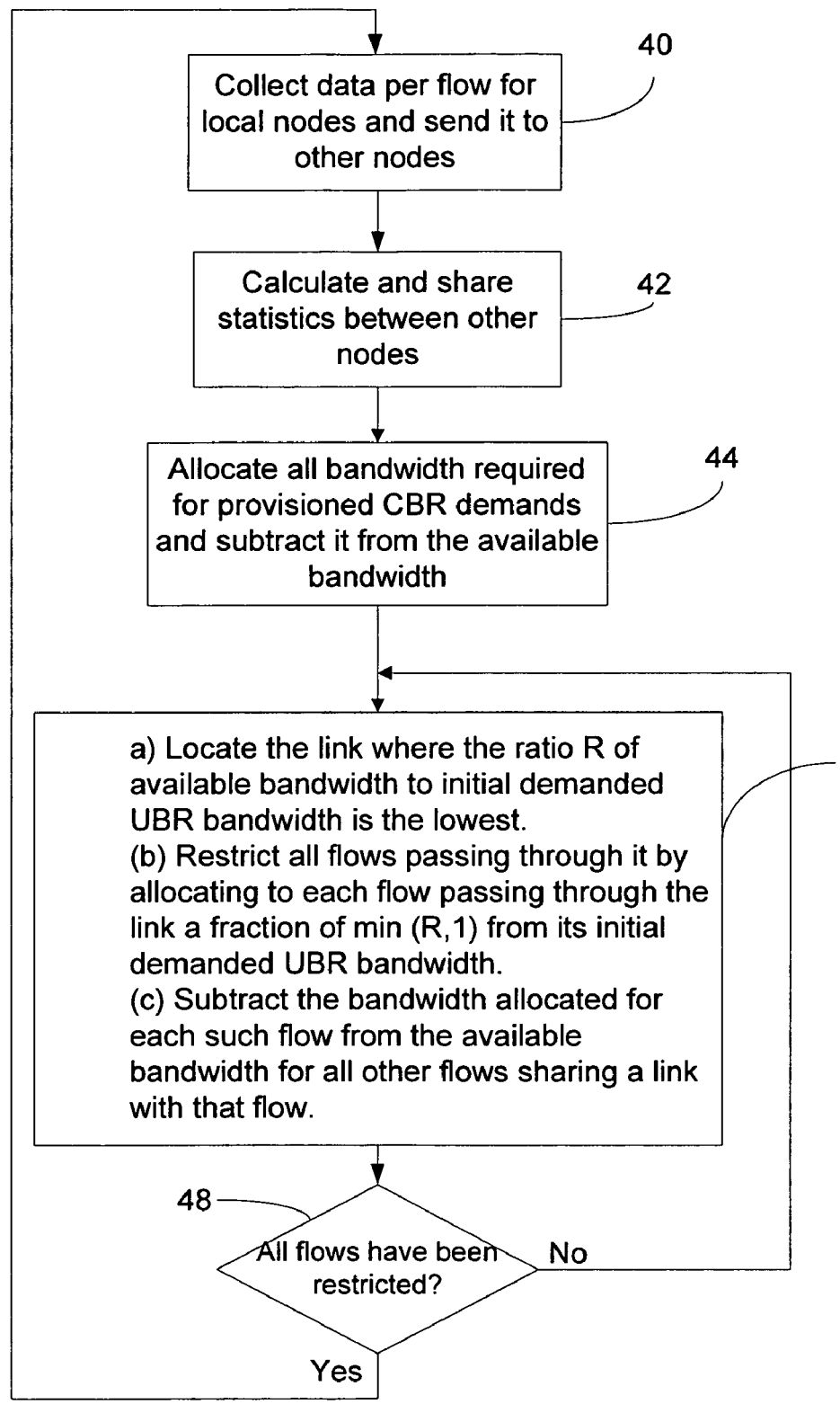
FIG. 3 is a flow chart illustrating a dynamic bandwidth allocation algorithm according to a preferred embodiment of the present invention.

Referring now to FIG. 3, there is shown a flow chart illustrating a dynamic bandwidth allocation algorithm according to a preferred embodiment of the invention, used during normal operation of the network of the invention. This algorithm is substantially similar to the initial bandwidth allocation algorithm described above with reference to FIG. 2, with the additional steps of taking into account global traffic data collected throughout the network.

Periodically (preferably several times a second), each edge device which has collected data and/or extrapolated traffic data broadcasts this information to the other edge devices and/or to the management device which are running the network algorithm, using any standard signaling protocol (block 40) and receives statistics from all the other devices (block 42).

These edge devices each store the bandwidth allocation algorithm which calculates the optimal allocation at any given time. Given knowledge of each flow's bandwidth demands, as well as the most recently updated provisioning tables (specifically, the amount of CBR and UBR for each flow), each edge device independently computes the amount of bandwidth to allocate for each flow that enters the network through it. It will be appreciated that, since each edge device receives all the statistics from all other edge devices, and since each edge device has the same software, all the edge devices will calculate the identical amount of bandwidth to be allocated at any given time to which flows. Alternatively, the central management device may make all the calculations, and using the software, reach an optimal bandwidth allocation scheme, which it then distributes to each of the edge devices.

In the exemplary embodiment, the algorithm ensures that CBR requirements are met and that excess network capacity is fairly allocated between UBR requirements. This is accomplished, for example, by allocating all the bandwidth required for current CBR demands for every link, and subtracting this amount from the total available bandwidth for that link (block 44). Now the following three steps (which are substantially similar to those in the initial bandwidth allocation) are carried out (block 46): (a) The link where the ratio R of available bandwidth to demanded UBR bandwidth is the lowest is located; (b) All flows passing through this link are restricted in a fair manner, i.e., each flow passing through the link is allocated a function of R of its demanded UBR bandwidth, consisting of min (R,1) where $$R = \frac{WR - \sum CBR_{Demanded}}{\sum UBR_{Demanded}},$$

WR being the wire rate bandwidth of the link, meaning that each flow is allocated either: the fraction of its demanded UBR bandwidth obtained by multiplying the demanded bandwidth by R, or the total demanded bandwidth for that flow, whichever is smaller; and (c) The bandwidth allocated for each such flow is now subtracted from the available bandwidth for all other flows passing through any of the same links that this flow passes through. These three steps are repeated until all the edge devices have been considered and all the flows have been restricted (block 48), at which time the entire process is repeated from block 40.

It will be appreciated that this algorithm may be run, for example, several times a second, at the same frequency at which statistics updates are exchanged. Preferably, this occurs every one tenth of a second. The complexity of the algorithm is a function of the number of flows in the network and the number of edge devices.

It will further be appreciated that packets or frames which are not allocated bandwidth may be immediately discarded. A higher layer protocol (e.g. TCP) will decide when or if to retransmit that data.

The exemplary algorithm according to the present invention generally ensures that all flows are provisioned according to their requirements, and that no congestion occurs within the core network, as long as the actual bandwidth demands for each flow at each point in time are consistent with the statistics collected for it in the previous short time period. This assumption breaks when a flow suddenly changes its demands, e.g., a user starts a new ftp connection through a flow. In such cases, the bandwidth for the flow is only made available after a short delay, rather than instantly. This problem can be addressed in several ways:

Increase the frequency of updates as much as possible. This approach is inherently restricted, as it increases the processor requirements at the edge devices and the bandwidth overhead used for exchanging the statistics packets, Reserving a certain fraction of the network bandwidth for immediately responding to increases in CBR bandwidth demands. This approach is also inherently restricted as it lowers network utilization.

Provisioning of "always on" CBR requirements as described above. This ensures customers of some bandwidth that is guaranteed to be available "instantly". While this approach is also inherently limited, it has the benefit of allowing the providers to offer an additional, differentiated high-priced service.

In the method of bandwidth allocation described above, for each bandwidth allocation interval, the bandwidth allocation is fixed and static. However, occasionally a subscriber sends bursts of data, meaning short periods of time in which the traffic (usually real time flows of video and voice) which tries to enter the network exceeds the subscriber's nominal CBR value. When the average traffic for the subscriber is less than or equal to his nominal CBR value, it may be desired to permit the traffic to pass through the network. One method of dealing with such bursts of data exceeding the allocated bandwidth values is to provide buffering inside the edge switch, wherein frames are allowed through the edge switch into the network at a rate such that the average bandwidth transmitted by the subscriber does not exceed his provisioned value.

However, the delays associated with buffering data are undesirable. To support the rapid transfer of such data bursts without buffering, the method described above can be modified. The immediate transfer of un-buffered bursts serves to eliminate undesirable delays.

Since bursts of data do not comply with the allocated bandwidth scheme and potentially can cause congestion, according to one exemplary embodiment of the invention, two different mechanisms are added into the network:

First, the CBR of a selected portion of the data flows of the relevant subscriber is classified as strict priority (traffic that must pass through the network), while the UBR of that subscriber and of other subscribers is classified as best effort (traffic that may be dropped in case of congestion). Other intermediate values may be also used, if desired, to provide different levels of priority classes. The classification is done at the edge switches according to a MBS (Maximum burst size) value set forth in the subscriber's SLA. During the provisioning process, the algorithm of the present invention calculates the MBS allocations such that the maximum anticipated MBS shall not overload the network. In other words, the flows marked as strict priority (CBR+MBS) must be less than or equal to the total bandwidth in the network. This is accomplished by assuring that, for each link in the network, the sum of the strict priority for the link is less than the wire rate of that link. The UBR of all the subscribers is classified as best effort. Each edge device is also programmed to mark, as by color marking, each frame in that flow entering the network through that device according to its priority classification.

Second, support for simple QoS decisions (identification of marked traffic and capability of deciding pass or not pass) is provided to the core switches. This allows the core switches to prioritize classes of traffic according to their marking, and to drop best effort frames in case of congestion in the network. Once the priorities are set for each flow according to the subscriber's SLA, each edge switch marks each entering frame with its relevant priority class (e.g., strict, best effort, etc.) using any standard marking mechanism, such as VLAN, Diffserv, TOS, etc.

If all flows are transmitting according to their allocated bandwidth, the network behaves as described above, and all per flow QoS decisions are made by the edge switches. However, if one or more of the MBS provisioned flows sends a burst of data, it may cause potential congestion at the relevant edge and/or core switches. For purposes of the present application, congestion occurs when entry into a switching device (edge switch or core switch) is requested for more frames than the device can deliver into the network. Each switch, including core switches, is able to recognize when there is congestion, i.e., when more frames are trying to enter than it can transfer into the network. In this case, the switch will identify the classes of the marked frames and, when they identify a burst of data associated with a strict priority class, they will drop a portion of the best effort class frames as necessary in order to resolve the congestion.

The statistics about the change in behavior of the flows is then collected and taken into account for the next bandwidth allocation, as described above, in order to eliminate the congestion.

It should be appreciated that while the core switches should have per class QoS features, there is no need for the core switches to have per flow QoS, thus enabling the use of simple core switches. As few as two classes (best effort and strict priority) are sufficient for this embodiment of the invention.

While the present invention has been described with respect to a limited number of embodiments, it will be appreciated that many variations, modifications and other applications of the present invention may be made. It will further be appreciated that the present invention is not limited to what has been described hereinabove merely by way of example.

The invention claimed is:

1. A method for controlling admission of data traffic in a telecommunications network having an allocatable bandwidth, the network including a plurality of edge devices coupled by a plurality of core devices, each said core device being without per flow admission control capability, over a plurality of physical links and a plurality of flows over each said link, each flow having a defined physical connection scheme, the method comprising:

receiving input data, at said edge devices, for each of said physical links in the network, said data including for each of the links a wire rate bandwidth, and a provisioned committed bandwidth and a provisioned best effort bandwidth for each flow in said link;

calculating an available best effort bandwidth for each said link in the entire network from said wire rate bandwidth and said provisioned committed bandwidth;

dynamically allocating to data traffic, at said edge devices, said available best effort bandwidth for each said flow at said edge device, including provisioned best effort bandwidth not demanded and available for allocation, as a function of (i) Service Level Agreement (SLA) or said provisioned best effort bandwidth for each said flow in said network, (ii) the available best effort bandwidths for each flow at each said link in said network, and (iii) a total best effort bandwidth demanded by said data traffic requesting ingress at each said link at a given time in said network, by allocating to each flow a portion of said demanded best effort bandwidth of said flow in accordance with said SLA for each said flow to provide fair allocation of available best effort bandwidth to all flows demanding bandwidth; and admitting said data traffic to the network at said time according to said bandwidth allocated for said traffic over the entire physical connection scheme of said traffic through the network.

2. The method according to claim 1 further comprising:

collecting demanded bandwidth and allocated bandwidth data for each said flow in the network;

calculating a demanded committed bandwidth demanded for each said physical link and a demanded best effort bandwidth demanded for each said flow;

calculating an available best effort bandwidth from said allocatable bandwidth and said demanded committed bandwidth; and dynamically allocating said available best effort bandwidth of said link at said time of ingress proportionally between said demanded best effort bandwidths of said flows on said link.

3. The method according to claim 2, further comprising:

calculating, from said collected data, bandwidth demand and allocation statistics of committed and best effort bandwidth for each flow in the network; and periodically performing said step of allocating based on said statistics.

4. The method according to claim 1, further comprising allocating bandwidth for bursts of data such that the total actually allocated is less than or equal to the allocatable bandwidth.

5. The method according to claim 4, wherein said step of allocating bandwidth for bursts of data includes:

classifying said provisioned committed bandwidth of at least one flow as strict priority or committed bandwidth;

classifying said provisioned best effort bandwidth as best effort;

marking each frame in each flow according to its classification;

recognizing congestion in the link;

in response to said recognition, identifying said markings; and always passing frames having strict priority or committed bandwidth marking, and dropping a portion of frames having best effort marking, so as to relieve said congestion.

6. The method according to claim 3, further comprising allocating bandwidth for bursts of data such that the total actually allocated is less than or equal to the allocatable bandwidth.

7. The method according to claim 6, wherein said step of allocating bandwidth for bursts of data includes:

classifying said provisioned committed bandwidth of at least one flow as strict priority or committed bandwidth;

classifying said provisioned best effort bandwidth as best effort;

marking each frame in each flow according to its classification;

recognizing congestion in the link;

in response to said recognition, identifying said markings; and always passing frames having strict priority or committed bandwidth marking, and dropping a portion of frames having best effort marking, so as to relieve said congestion.

8. A method for controlling admission of data traffic in a telecommunications network having an allocatable bandwidth, the network including at least two edge devices coupled by at least one physical link and at least two flows over each said link, each flow having a defined physical connection scheme, the method comprising:

receiving input data, at said edge devices, for each of said physical links in the network, said data including for each of the links a wire rate bandwidth, and a provisioned committed bandwidth and a provisioned best effort bandwidth for each flow in said link;

calculating an available best effort bandwidth for each said link in the entire network from said wire rate bandwidth and said provisioned committed bandwidth; and allocating, at said edge devices, said available best effort bandwidth for each said link between said flows in said link proportionally to said provisioned best effort bandwidth for each said flow in said link;

collecting demanded bandwidth and allocated bandwidth data for each said flow in the network;

calculating a demanded committed bandwidth demanded for each said physical link and a demanded best effort bandwidth demanded for each said flow;

calculating an available best effort bandwidth from said allocatable bandwidth and said demanded committed bandwidth; and allocating said available best effort bandwidth of said link proportionally between said demanded best effort bandwidths of said flows on said link;

calculating, from said collected data, bandwidth demand and allocation statistics of committed and best effort bandwidth for each flow in the network; and periodically performing said step of allocating based on said statistics;

wherein said step of periodically performing the step of allocating includes:

(a) locating a first link where a ratio R of available bandwidth in said first link to demanded best effort bandwidth in said first link is smallest;

(b) calculating a portion of the demanded best effort bandwidth for each flow passing through said first link, said portion being a function of said ratio R;

(c) allocating to each said flow passing through said first link said portion of its demanded best effort bandwidth; and (d) calculating an available best effort bandwidth for all other links through which at least one of said flows passes by subtracting said allocated bandwidth of said flow on said first link from available bandwidth at each said link through which at least one of said flows passing through said first link also passes.

9. The method according to claim 8, wherein said step (d) of calculating an available bandwidth includes:
(e) subtracting said allocated bandwidth for all flows on said first link from an available bandwidth for a second link through which at least one of said flows passing through said first link also passes; and
(f) repeating steps (a), (b), (c) and (d) until a portion of demanded best effort bandwidth has been allocated to each said flow in the network.

10. The method according to claim 8, wherein said step (b) includes allocating to each flow either: the available best effort bandwidth divided by a sum of demanded best effort bandwidth for all flows on said first link, multiplied by the demanded best effort bandwidth of said flow; or the demanded best effort bandwidth for that flow; whichever is smaller.

11. A non-transitory computer-readable storage medium containing a set of instructions for a computer coupled to a telecommunications network, the network having an allocatable bandwidth and including a plurality of edge devices coupled by a plurality of core devices, each said core device being without per flow admission control capability, over a plurality of physical links and a plurality of flows over each said physical link, each said flow having a defined physical connection scheme, the set of instructions, when executed by the computer, causing the computer to perform the following steps:
receive input data, at said edge devices, for each of said physical links in the network, said data including for each link a wire rate bandwidth, and a provisioned committed bandwidth and a provisioned best effort bandwidth for each flow in said link;
calculate an available best effort bandwidth for each said link in the entire network from said wire rate bandwidth and said provisioned committed bandwidth; and
dynamically allocate to data traffic, at said edge devices, said available best effort bandwidth for each said flow at said edge device, including provisioned best effort bandwidth not demanded and available for allocation, as a function of (i) Service Level Agreement (SLA) or said provisioned best effort bandwidth for each said flow in said network, (ii) the available best effort bandwidths for each flow at each said link in said network, and (iii) a total best effort bandwidth demanded by said data traffic requesting ingress at each said link at a given time in said network, by allocating to each flow a portion of said demanded best effort bandwidth of said flow in accordance with said SLA for each said flow to provide fair allocation of available best effort bandwidth to all flows demanding bandwidth, so as to admit said data traffic to the network at said time according to said bandwidth allocated for said traffic over the entire physical connection scheme of said traffic through the network.

12. The computer-readable storage medium according to claim 11, wherein the set of instructions, when executed by the computer, cause the computer to perform the following steps:
collecting demanded bandwidth and allocated bandwidth data for each said flow in the network;
calculating a demanded committed bandwidth demanded for each said physical link and a demanded best effort bandwidth demanded for each said flow;
calculating an available best effort bandwidth from said allocatable bandwidth and said demanded committed bandwidth; and
dynamically allocating said available best effort bandwidth of each link at said time of ingress proportionally between said demanded best effort bandwidths of said flows on said link.

13. The computer-readable storage medium according to claim 12, wherein the set of instructions, when executed by the computer, cause the computer to perform the following steps:
calculating, from said collected data, bandwidth demand and allocation statistics of committed and best effort bandwidth for each flow in the network; and
periodically performing said step of allocating based on said statistics.

14. The computer-readable storage medium according to claim 11, wherein the set of instructions, when executed by the computer, cause the computer to additionally perform the following step:
allocate bandwidth for bursts of data such that the total actually allocated is less than or equal to the allocatable bandwidth.

15. The computer-readable storage medium according to claim 14, wherein the set of instructions, when executed by the computer, cause the computer to perform the step of allocating bandwidth for bursts of data by:
classifying said provisioned committed bandwidth of at least one flow as strict priority or committed bandwidth;
classifying said provisioned best effort bandwidth as best effort;
marking each frame in each flow according to its classification;
recognizing congestion in the link;
in response to said recognition, identifying said markings; and
always passing frames having said strict priority or committed bandwidth marking, and dropping a portion of frames having best effort marking, so as to relieve said congestion.

16. The computer-readable storage medium according to claim 13, wherein the set of instructions, when executed by the computer, cause the computer to additionally perform the following step:
allocate bandwidth for bursts of data such that the total actually allocated is less than or equal to the allocatable bandwidth.

17. The computer-readable storage medium according to claim 16, wherein the set of instructions, when executed by the computer, cause the computer to perform the step of allocating bandwidth for bursts of data by:
classifying said provisioned committed bandwidth of at least one flow as strict priority or committed bandwidth;
classifying said provisioned best effort bandwidth as best effort;
marking each frame in each flow according to its classification;
recognizing congestion in the link;
in response to said recognition, identifying said markings; and
always passing frames having said strict priority or committed bandwidth marking, and dropping a portion of frames having best effort marking, so as to relieve said congestion.

18. A network device for a telecommunications network having an allocatable bandwidth, the network including a plurality of edge devices coupled by a plurality of core devices, each said core device being without per flow admission control capability, over a plurality of physical links and a plurality of flows over each said link, each flow having a defined physical connection scheme, the device comprising:
- a processor configured to
  - receive input data, at said edge devices, for each of said physical links in the network, said data including for each of the links a wire rate bandwidth, and a provisioned committed bandwidth and a provisioned best effort bandwidth for each flow in said link,
  - calculate an available best effort bandwidth for each said link in the entire network from said wire rate bandwidth and said provisioned committed bandwidth, and
  - dynamically allocate to data traffic, at said edge devices, said available best effort bandwidth for each said flow at said edge device, including provisioned best effort bandwidth not demanded and available for allocation, as a function of (i) Service Level Agreement (SLA) or said provisioned best effort bandwidth for each said flow in said network, (ii) the available best effort bandwidths for each flow at each said link in said network, and (iii) a total best effort bandwidth demanded by said data traffic requesting ingress at each said link at a given time in said network, by allocating to each flow a portion of said demanded best effort bandwidth of said flow in accordance with said SLA for each said flow to provide fair allocation of available best effort bandwidth to all flows demanded bandwidth; and
- a port for admitting said data traffic to the network at said time according to said bandwidth allocated for said traffic over the entire physical connection scheme of said traffic through the network.

19. The device according to claim 18, further comprising: a user interface, the processor configured to received the input data from a user via the user interface.

20. The device according to claim 18, wherein the processor is further configured to collect demanded bandwidth and allocated bandwidth data for each said flow in the network;
- calculate a demanded committed bandwidth demanded for each said physical link and a demanded best effort bandwidth demanded for each said flow;
- calculate an available best effort bandwidth from said allocatable bandwidth and said demanded committed bandwidth; and
- dynamically allocate said available best effort bandwidth of each link at said time of ingress proportionally between said demanded best effort bandwidths of said flows on said link.

21. The device according to claim 20, wherein the processor is further configured to:
- calculate, from said collected data, bandwidth demand and allocation statistics of committed and best effort bandwidth for each flow in the network; and
- periodically perform said step of allocating based on said statistics.

22. The device according to claim 18, wherein the network device is a network management device.

23. The device according to claim 18, wherein the network device is a switching device in said at least one link.

24. The device according to claim 18, wherein the processor is further configured to allocate bandwidth for bursts of data such that the total actually allocated is less than or equal to the allocatable bandwidth.

25. The device according to claim 23, wherein the processor is configured to allocate bandwidth for bursts of data by:
- classifying said provisioned committed bandwidth of at least one flow as strict priority or committed bandwidth;
- classifying said provisioned best effort bandwidth as best effort;
- marking each frame in each flow according to its classification;
- recognizing congestion in the link;
- in response to said recognition, identifying said markings; and
- always passing frames having strict priority or committed bandwidth marking, and dropping a portion of frames having best effort marking in response to said recognition of congestion, so that the total actually allocated is less than or equal to the allocatable bandwidth.

26. A system for controlling admission of data traffic to a telecommunications network having an allocatable bandwidth, the network including a plurality of edge devices coupled by a plurality of core devices, each said core device being without per flow admission control capability, over a plurality of physical links and a plurality of flows over each said link, each said flow having a defined physical connection scheme, the system comprising:
- a plurality of switching devices, each of the switching devices including a processor configured to
  - receive input data, at said edge devices, for each of the physical links in the network, said data including for each of the links a wire rate bandwidth, and a provisioned committed bandwidth and a provisioned best effort bandwidth for each flow in said link,
  - calculate an available best effort bandwidth for each said link in the entire network from said wire rate bandwidth and said provisioned committed bandwidth, and
  - dynamically allocate to data traffic, at said edge devices, said available best effort bandwidth for each said flow at said edge device, including provisioned best effort bandwidth not demanded and available for allocation, as a function of (i) Service Level Agreement (SLA) or said provisioned best effort bandwidth for each said flow in said network, (ii) the available best effort bandwidths for each flow at each said link in said network, and (iii) a total best effort bandwidth demanded by said data traffic requesting ingress at each said link at a given time in said network, by allocating to each flow a portion of the demanded best effort bandwidth of said flow in accordance with said SLA for each said flow to provide fair allocation of available best effort bandwidth to all flows demanding bandwidth, whereby said data traffic is admitted to the network at said time according to said bandwidth allocated for said traffic over the entire physical connection scheme of said traffic through the network.

27. A system according to claim 26, wherein said switching devices are further configured to:
- collect demanded bandwidth and allocated bandwidth data for each said flow in the network;
- calculate a demanded committed bandwidth demanded for each said physical link and a demanded best effort bandwidth demanded for each said flow;
- calculate an available best effort bandwidth from said allocatable bandwidth and said demanded committed bandwidth; and
- dynamically allocate said available best effort bandwidth of said link at said time of ingress proportionally between said demanded best effort bandwidths of said flows on said link.

28. The system according to claim 26, wherein said switching devices are further configured to:
  calculate, from said collected data, bandwidth demand and allocation statistics of committed and best effort bandwidth for each flow in the network; and
  periodically perform said step of allocating based on said statistics.

29. The system according to claim 26, wherein said switching devices are further configured to:
  allocate bandwidth for bursts of data such that the total actually allocated is less than or equal to the allocatable bandwidth.

30. The system according to claim 29, wherein said switching devices are configured to allocate bandwidth for bursts of data by:
  classifying said provisioned committed bandwidth of at least one flow as strict priority or committed bandwidth;
  classifying said provisioned best effort bandwidth as best effort;
  marking each frame in each flow according to its classification;
  recognizing congestion in the link;
  in response to said recognition, identifying said markings; and
  always passing frames having strict priority or committed bandwidth marking, and dropping a portion of frames having best effort marking, in response to said recognition of congestion, so that the total actually allocated is less than or equal to the allocatable bandwidth.

31. The system according to claim 28, wherein said switching devices are further configured to:
  allocate bandwidth for bursts of data such that the total actually allocated is less than or equal to the allocatable bandwidth.

32. The system according to claim 31, wherein said switching devices are configured to allocate bandwidth for bursts of data by:
  classifying said provisioned committed bandwidth of at least one flow as strict priority or committed bandwidth;
  classifying said provisioned best effort bandwidth as best effort;
  marking each frame in each flow according to its classification;
  recognizing congestion in the link;
  in response to said recognition, identifying said markings; and
  always passing frames having strict priority or committed bandwidth marking, and dropping a portion of frames having best effort marking, in response to said recognition of congestion, so that the total actually allocated is less than or equal to the allocatable bandwidth.

33. A system for controlling admission of data traffic to a telecommunications network having an allocatable bandwidth, the network including a plurality of edge devices coupled by a plurality of core devices, each said core device being without per flow admission control capability, over a plurality of physical links and a plurality of flows over each said link, each said flow having a defined physical connection scheme, the system comprising:
  a controller including a processor configured to
    receive input data, from said edge devices, for each of the physical links in the network, said data including for each of the links a wire rate bandwidth, and a provisioned committed bandwidth and a provisioned best effort bandwidth for each flow in said link,
    dynamically calculate an available best effort bandwidth for each said link in the entire network from said wire rate bandwidth and said provisioned committed bandwidth, and
    dynamically form an allocation scheme, at said edge devices, to allocate said available best effort bandwidth available for each said flow at said edge device, including provisioned best effort bandwidth not demanded and available for allocation, as a function of (i) Service Level Agreement (SLA) or said provisioned best effort bandwidth for each said flow in said network, (ii) the available best effort bandwidths for each flow at each said link in said network, and (iii) a total best effort bandwidth demanded by said data traffic requesting ingress at each said link at a given time in said network, each flow being allocated a portion of the demanded best effort bandwidth of said flow in accordance with said SLA for each said flow to provide fair allocation of available best effort bandwidth to all flows demanding bandwidth; and
  at least two switching devices for admitting said data traffic to the network at said time according to said bandwidth allocated for said traffic over the entire physical connection scheme of said traffic through the network, the controller configured to distribute the allocation scheme to each of the switching devices; and
  at least one core device coupled to said edge devices, each said core device being without per flow admission control capability.

34. A system according to claim 33, wherein said switching devices are further configured to:
  collect demanded bandwidth and allocated bandwidth data for each said flow in the network;
  calculate a demanded committed bandwidth demanded for each said physical link and a demanded best effort bandwidth demanded for each said flow;
  calculate an available best effort bandwidth from said allocatable bandwidth and said demanded committed bandwidth; and
  dynamically allocate said available best effort bandwidth of each link at said time of ingress proportionally between said demanded best effort bandwidths of said flows on said link.

35. The system according to claim 33, wherein said switching devices are further configured to:
  calculate, from said collected data, bandwidth demand and allocation statistics of committed and best effort bandwidth for each flow in the network; and
  periodically perform said step of allocating based on said statistics.

36. The system according to claim 33, wherein said switching devices are further configured to:
  allocate bandwidth for bursts of data such that the total actually allocated is less than or equal to the allocatable bandwidth.

37. The system according to claim 36, wherein:
  said switching devices are configured to allocate bandwidth for bursts of data by:
    classifying said provisioned committed bandwidth of at least one flow as strict priority or committed bandwidth;
    classifying said provisioned best effort bandwidth as best effort; and
    marking each frame in each flow according to its classification;

the system further comprising:
- switches capable of recognizing congestion in the link; and
- in response to said recognition, said switches identifying said markings, always passing frames having said strict priority or committed bandwidth marking, and dropping a portion of frames having best effort marking, so that the total actually allocated is less than or equal to the allocatable bandwidth.

38. The system according to claim 37, the system further comprising:
- core switches in each said link including means for recognizing congestion in the link;
- said core switches including means for identifying said markings, for always passing frames having strict priority or committed bandwidth marking, and for dropping a portion of frames having best effort marking, in response to said recognition of congestion, so that the total frames passed to the link is equal to or less than the wire rate of that link.

39. A system for controlling admission of data traffic to a telecommunications network, the system comprising:
- a plurality of edge devices coupled by a plurality of core devices, each said core device being without per flow admission control capability, over a plurality of physical links and a plurality of flows over each said link, each said edge device having an admission controller for per flow admission control;
- a processor configured to receive input data, from said edge devices, for each of the physical links in the network, said data including for each of the links a wire rate bandwidth, and a provisioned committed bandwidth and a provisioned best effort bandwidth for each flow in said link;
- said processor further configured to dynamically calculate an available best effort bandwidth for each said link in the entire network from said wire rate bandwidth and said provisioned committed bandwidth, and control the dynamic allocation, at said edge devices, of said available best effort bandwidth for each said flow at said edge device, including provisioned best effort bandwidth not demanded and available for allocation, as a function of (i) Service Level Agreement (SLA) or said provisioned best effort bandwidth for each said flow in said network, (ii) the available best effort bandwidths for each flow at each said link in said network, and (iii) a total best effort bandwidth demanded by said data traffic requesting ingress at each said link at a given time in said network, each flow being allocated a portion of the demanded best effort bandwidth of said flow in accordance with said SLA for each said flow to provide fair allocation of available best effort bandwidth to all flows demanding bandwidth; and
- at least one core device coupled to said edge devices, said core device having an admission controller for per link admission control but being without per flow admission control capability.

40. A method for controlling admission of data traffic in a telecommunications network having an allocatable bandwidth, the network including a plurality of edge devices coupled by a plurality of core devices, each said core device being without per flow admission control capability, over a plurality of physical links and a plurality of flows over each said link, each flow having a defined physical connection scheme, the method comprising:
- receiving input data, at said edge devices, for each of said physical links in the network, said data including for each of the links a wire rate bandwidth, and a provisioned committed bandwidth and a provisioned best effort bandwidth for each flow in said link;
- calculating an available best effort bandwidth for each said link in the entire network from said wire rate bandwidth and said provisioned committed bandwidth; and
- dynamically allocating, at each of the edge devices, the available best effort bandwidth for each flow, including provisioned best effort bandwidth not demanded and available for allocation, each flow being allocated a portion of the demanded best effort bandwidth of said flow in accordance with a Service Level Agreement (SLA) for each said flow to provide fair allocation of available best effort bandwidth to all flows demanding bandwidth, by first allocating the best effort bandwidths for flows that pass through a first link before allocating the best effort bandwidths for flows that do not pass through the first link, where a ratio R of available bandwidth in the first link to demanded best effort bandwidth in the first link is smaller than at other links in the network.

* * * * *